Sept. 30, 1969 J. J. LAREW 3,470,423

CLOSED LOOP MODULATED LIGHT RECOGNITION SYSTEM

Filed Nov. 26, 1965 2 Sheets-Sheet 1

INVENTOR.
JOHN J. LAREW
BY W. J. Shanley, Jr.
HIS ATTORNEY

CLOSED LOOP MODULATED LIGHT RECOGNITION SYSTEM

Filed Nov. 26, 1965 2 Sheets-Sheet 2

INVENTOR.
JOHN J. LAREW
BY W. J. Shanley, Jr.
HIS ATTORNEY

United States Patent Office 3,470,423
Patented Sept. 30, 1969

3,470,423

CLOSED LOOP MODULATED LIGHT RECOGNITION SYSTEM

John J. Larew, Waynesboro, Va., assignor to General Electric Company, a corporation of New York Filed Nov. 26, 1965, Ser. No. 509,750
Int. Cl. H01h 47/24
U.S. Cl. 317—125 10 Claims

ABSTRACT OF THE DISCLOSURE

A modulated light arrangement comprising a light source, a light sensor, and a tuned amplifier coupled with said source and sensor in a regenerative circuit whose frequence of oscillation establishes the modulation rate of the modulated light emitted by said source.

My invention relates to modulated light recognition systems and, more particularly, to closed loop modulated light recognition systems.

A modulated light recognition system generally comprises a light source which transmits light over a prescribed distance to a light sensitive receiver. The transmitted light is modulated at a predetermined frequency and the receiver is tuned to receive light at this frequency and reject all other light. The receiver is coupled to an output circuit which may have a relay which is actuated by a change in the level of transmitted light sensed by the receiver, as where an object breaks the path of the light.

In some prior modulated light recognition systems a transmitter comprises a steady source of light, such as an incandescent lamp, followed by a slotted disk for modulating the light and a transmitting lens. The fact that a mechanical modulator of this type is used makes such a system bulky due to the size of the motor and the disk required. The use of a constant light source such as an incandescent lamp also adds to the size of the system and to the maintenance thereof when the lamp filament burns out.

Some prior art mechanical and electronic modulated light systems have been designed to operate in the audio frequency range due to the limitation of the components used. Due to this restricted frequency range the response time of these modulated light systems to a change in the level of modulated light received is likewise limited. For a tuned circuit having a given Q at some frequency, it takes a certain number of cycles for the tuned circuit to respond to a burst of energy at this frequency and takes several cycles for a transient signal in the tuned circuit to die down after a source has ceased to energize the circuit. Where the energy is modulated at a higher frequency, the response time is less since the needed cycles of oscillation occur much more quickly.

Some prior art modulated light relay systems use an oscillator circuit at the transmitter to energize a light emitting device, along with the tuned receiver circuits. However, these oscillator circuits add components to the transmitter. Furthermore, it is possible for a substantial frequency shift to occur in either or both of the transmitter and receiver circuits with a change in ambient conditions. The relay system may cease to function properly with the transmitter and receiver out of tune.

It is therefore an object of my invention to provide an improved, inexpensive modulated light recognition system.

It is another object of my invention to provide a modulated light recognition system having a quick response to changes in the input energy level.

It is a further object of my invention to provide a modulated light recognition system which can operate over a wide frequency range.

It is still another object of my invention to provide a modulated light recognition system which is insensitive to frequency change in the system.

Briefly stated, and in accordance with one aspect of this invention, a modulated light recognition system is provided for responding to a change in the level of modulated light received by a receiving circuit from a light emitting device. The light emitting device is energized by means of a regenerative electrical circuit coupled between it and a light receiving circuit responsive to this device. The regenerative circuit causes this device to emit the light signals to which the receiving circuit is responsive.

While the specification concludes with claims particularly pointing out and distinctly claiming the subject matter which is regarded as my invention, it is believed that my invention will be better understood from the following description taken in connection with the accompanying drawings in which:

Figure 1:
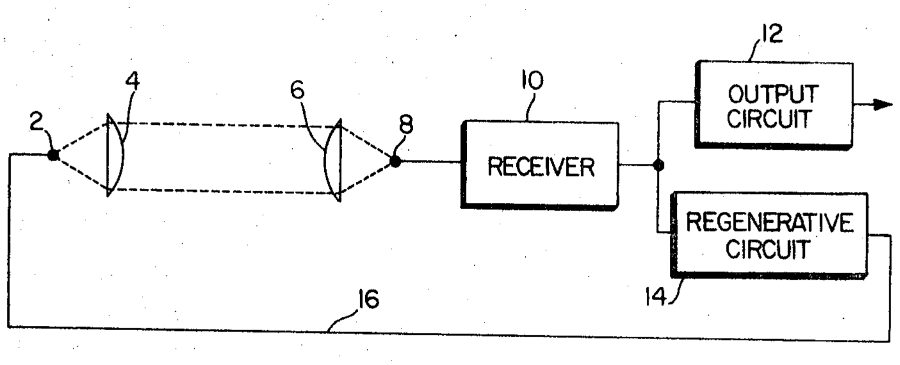
FIG. 1 is a block diagram showing one embodiment of this invention.

FIG. 1 shows a block diagram of one embodiment of my invention. A light emitting device 2 is a source of light located generally at the focal point of a transmitting optical lens 4 which forms the light into a column and transmits it to a receiving optical lens 6. The light emitting device 2 may comprise any device which can emit light in response to modulated electrical signals which energize the device. That is, the light emitted by this device must vary in intensity and duration of emission with the energizing signals. Examples of such devices are neon lamps and visible-light emitting diodes such as a gallium arsenide diode laser. Where laser-type devices are used, the lenses 4 and 6 may be omitted due to the narrow beams of light the laser-type devices produce. With respect to their response to modulated signals, it has been found that the light from gallium arsenide diodes can be modulated at frequencies up to 900 megacycles per second. The optical lenses 4 and 6 allow the light from the light emitting device 2 to be transmitted over a prescribed distance and to be properly focused where they are needed.

Light rays from the receiving optical lens 6 are focused on a light sensitive component 8 such as a light activated phototransistor or a solar cell which produces an electrical current in proportion to the light which is received. The light sensitive component 8 is coupled to a receiver 10 which distinguishes between the light sensitive component's response to light transmitted by the light emitting device 2 and its response to light from other sources. In one preferred embodiment of my invention the receiver includes a tuned amplifier circuit for this purpose. Another acceptable receiver could include a high pass amplifier circuit. The receiver 10 is coupled to an output circuit 12 and a feedback circuit 14. The output circuit 12 is of the type which can utilize signals from the receiver 10 to effect a load device in response to a change in the level of the light from the light emitting device 2 that is received by the light sensitive component 8. For example, the output circuit 12 may comprise a circuit for energizing a relay upon breaking of the path of light transmitted between the light emitting device 2 and the light sensitive component 8 or a circuit for providing a logic signal voltage.

The feedback circuit 14 comprises amplifier circuit means for establishing a positive feedback between the light sensitive component 8 and the light emitting device 2. The feedback circuit 14 is coupled through a feedback conductor 16 to the light emitting device 2. With the circuit shown, all the circuitry may be encased either in a receiver housing or a transmitter housing, while the components at the other site would comprise a light emitting device or a light sensitive component, respectively.

With respect to the operation of the circuit shown in FIG. 1, the feedback circuit 14 is biased by a power source in a manner such that it always couples a direct-current signal through the feedback conductor 16 to the light emitting device 2. Therefore, the light emitting device 2 transmits a constant low level light when there is no modulated signal to energize it. Due to the amount of positive feedback from the feedback circuit 14, any small fluctuation in the current supplied to the light emitting device 2, due to some minor instability in the system for example, sets the system into operation. That is, a fluctuation in the current supplied to the light emitting device 2 is transmitted to the optical system 4, received by the optical system 6, and sensed by the light sensitive component 8. Any component of this transient signal sensed by the light sensitive component 8 having the frequency to which the receiver 10 is responsive causes the receiver 10 to produce a signal for the output circuit 12 and the feedback circuit 14. The output circuit 12 responds to this signal to effect the load device. The feedback circuit 14 amplifies this signal and couples it through the feedback conductor 16 to the light emitting device 2, which again responds to the current fluctuations caused by this signal. Therefore, due to the regenerative nature of the system shown in FIG. 1, the light emitting device 2 transmits light pulses at the frequency to which the receiver 10 is responsive.

When the path between the light emitting device 2 and the light sensitive component 8 is broken, as where a physical object is placed between the optical systems 4 and 6, the oscillation of the system ceases and the output circuit 12 responds accordingly.

It is believed that a system of the type described can perform adequately in the frequency range of 455 kilocycles per second where the light emitting device comprises a laser-type device such as the gallium arsenide diode. In this frequency range high Q circuits can be used to better discriminate against unwanted light sources and still provide a quick response to an input signal. Since this frequency range is used as an intermediate frequency for commercial communications, the circuit components designed for use therein are mass produced making them both inexpensive and easy to obtain.

Figure 2:
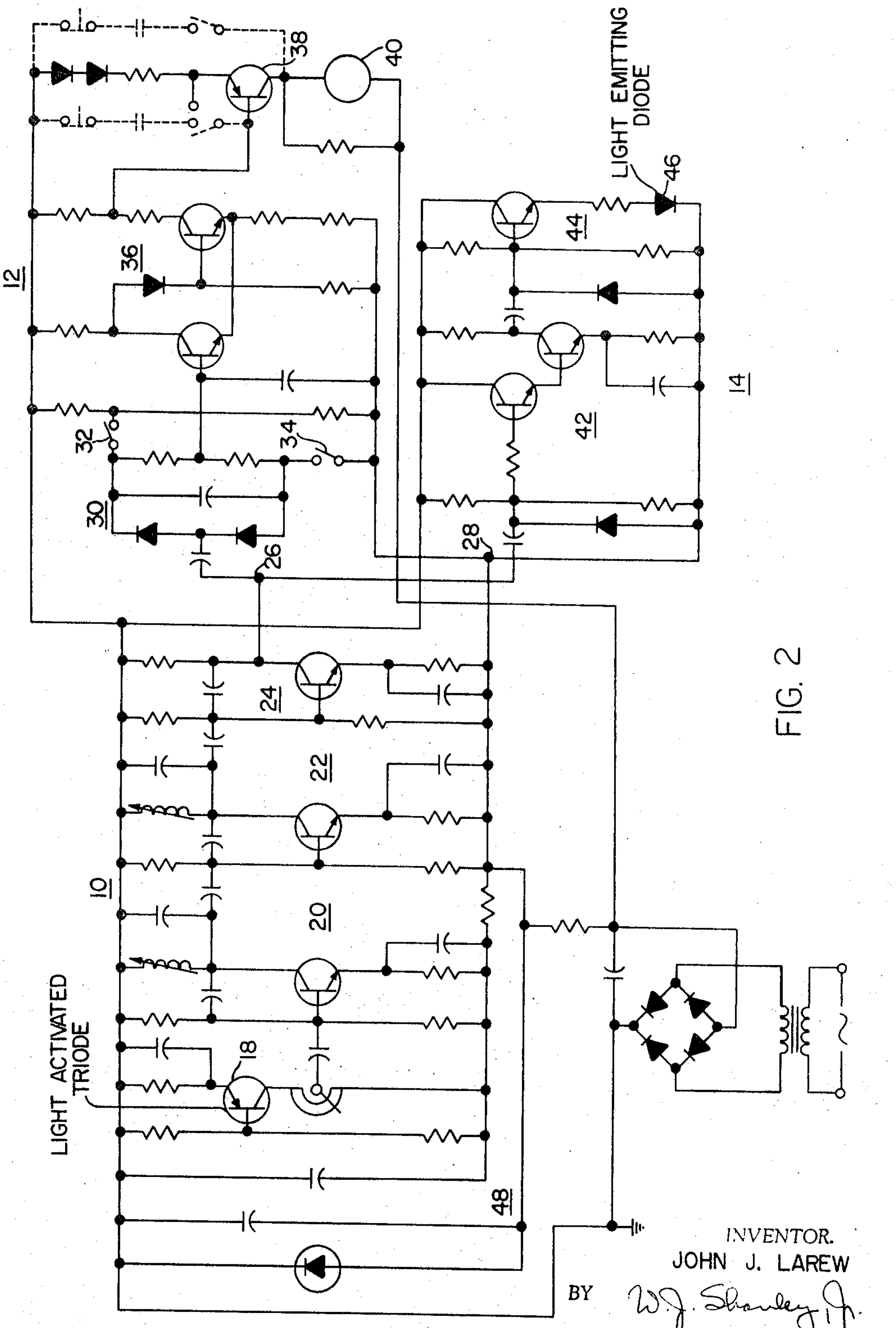
FIG. 2 is a schematic diagram showing circuits which may be used in accordance with one aspect of my invention.

FIG. 2 shows one example of the type of circuit which can be employed in a system of the type shown in FIG. 1. In this system, the light sensitive component comprises a light activated triode 18. The output from this triode is amplified in the receiver circuit 10 by a pair of tuned amplifiers 20 and 22 having tank circuits tuned to the frequency at which the system is to oscillate. The tuned amplifier 22 is coupled to an amplifier stage 24 which feeds output signals across the terminals 26 and 28.

The output circuit 12 comprises a detector 30 comprising a rectifier and a filter circuit coupled through a pair of switches 32 and 34 to a Schmitt trigger switching circuit 36. When the switch 32 is closed a positive bias is applied to the base of the following transistor and a signal present at 26 results in a negative-going voltage at the base of the transistor to turn it off. If the switch 34 is closed and the switch 32 is opened, there is no positive bias initially applied and signals at the terminal 26 cause a positive-going signal to be applied to the base of the transistor to turn it on. The Schmitt trigger 36 is coupled through a transistor 38 to a relay 40. The relay 40 controls the load device on activation and deactivation of the phototransistor 18.

The terminals 26 and 28 are also coupled to a feedback circuit 14 comprising a buffer amplifier circuit 42 and an emitter follower circuit 44. The emitter follower circuit 44 includes a light emitting diode 46. The optical systems located between the light emitting diode 46 and the phototransistor 18 have been omitted from FIG. 3. A regulated power supply 48 provides direct-current power for the circuit shown in FIG. 3.

The operation of the circuit shown in FIG. 2 is as was explained above with respect to FIG. 1. Therefore, the transistor in the emitter follower circuit 44 is biased so that a light emitting diode 46 is turned about halfway on. Any fluctuations in the current supplied to the light emitting diode 46 are transmitted through the optical systems so that they are sensed by the phototransistor 18. The tuned amplifiers 20 and 22 in the receiver 10 amplify any signals received by the light activated triode 18 which are at their tuned frequency. The amplifier 24 further amplifies the signals of this frequency and couples them across the terminals 26 and 28.

The action of the circuit 12 is such that signals across terminals 26 and 28 result in a direct-current output from the detector or filter circuit. The direct-current output is applied to the switching circuit 36 with the initial bias condition set by the position of switches 32 and 34, which may not be mutually closed. The magnitude of the signal at 26 determines whether or not the switching circuit 36 will be in one mode or the other. When the first transistor of circuit 12 is deenergized, and the second transistor is energized, the relay is activated. If switch 32 is closed this means that a signal must be present on terminal 26 to cause the relay to be energized. If switch 34 is closed the signal must be absent for relay energization.

The signals across the terminals 26 and 28 are coupled through the buffer amplifier 42 to the emitter follower 44. This regenerative feedback circuit provides a modulated current flow through the light emitting diode 46 which causes the emitted light to vary at the frequency to which the amplifiers 20 and 22 are tuned. Therefore, as long as light from the diode 46 is received by the phototransistor 18, the feedback circuit 14 causes the system shown in FIG. 2 to act as a closed-loop oscillator.

Whenever the path of the light between the diode 46 and the phototransistor 18 is broken the oscillation of this system stops. At this time the phototransistor 18 does not emit signals, and thus there are no signals across the terminals 26 and 28 to either energize the relay 40 or activate the feedback circuit 14.

My invention is not limited to the particular details of the embodiments illustrated, and it is contemplated that various modifications and applications thereof will occur to those skilled in the art. It is therefore intended that the appended claims cover such modifications and applications as do not depart from the direct spirit and scope of my invention.

What I claim as new and desire to secure by Letters Patent of the United States is:

1. In a modulated light system for actuating a relay in response to a break in a path of modulated light transmitted from a light emitting diode, the combination of:

a light emitting diode adapted to transmit light along a predetermined path;

receiving circuit means for providing an output indication of a break in the path of the modulated light emitted from said diode, said receiving circuit means including a light sensitive component mounted in the path of the transmitted light and responsive to the light transmitted from said diode, said receiving circuit also comprising an amplifier circuit coupled to said light sensitive component and designed to selectively amplify signals in a predetermined frequency range at which the light from said diode is modulated;

regenerative electrical circuit means coupled between said receiving circuit and said diode for energizing said diode with electrical signals from said receiving circuit when the light path is uninterrupted to cause said diode to emit a modulated light signal, the frequency of which is the natural oscillating frequency of the relay system.

2. A modulated light relay system according to claim 1 wherein said amplifier circuit is tuned to a predetermined frequency.

3. A modulated light relay system according to claim 1 wherein a relay is coupled to said receiving circuit to be responsive to signals therefrom.

4. In a modulated light recognition system for responding to a change in the level of light received from a light emitting device, a combination of:

a light emitting device, means for causing said device to transmit light along a predetermined path;

receiving circuit means for providing an output indication of a change in the level of modulated light received from said light emitting device, said receiving circuit means including a light sensitive component mounted in the path of the light transmitted from said light emitting device and responsive to the light emitted by said device, said receiving circuit means also including a first amplifier circuit coupled to said light sensitive component and responsive to signals above a predetermined frequency range;

second amplifier circuit means regeneratively coupled between said first amplifier circuit and said light emitting device for energizing said device with electrical energy modulated at a frequency within the frequency range of said first amplifier circuit to cause said device to emit a modulated light signal, said second amplifier circuit means being of such a nature that it can energize said light emitting device with modulated energy only when said light sensitive component is receiving modulated light signals from said light emitting device.

5. A modulated light recognition system according to claim 4 wherein said light emitting device is capable of responding to modulated electrical signals having a frequency above the audio frequency range.

6. A modulated light recognition system according to claim 4 wherein an output circuit is coupled to said receiver circuit means to be responsive to signals therefrom caused by modulated light received from said light emitting device.

7. A photoelectric control system comprising a light emitting diode positioned to transmit light through a space to be monitored, a light sensor arranged to receive said transmitted light and produce a sensor signal, a direct current bias circuit coupled to said light emitting diode to cause it to produce light at a given partial intensity, means for energizing said light emitting diode with an alternating signal superimposed on said direct current signal to produce a light output modulated at the frequency of said alternating signal comprising a frequency tuned amplifier, means for coupling said amplifier in a regenerative circuit comprising said sensor and said diode, said amplifier responsive to sensor signals to supply said alternating signal to said diode with a frequency established by the parameters of said regenerative circuit, and a control circuit normally operative in a first state and adapted to be switched to a second state in response to a change in the amplified alternating signal level due to a given change in the light transmission property of said space.

8. A photoelectric control system comprising a light emitting diode positioned to transmit light through a space to be monitored, a light sensor arranged to receive said transmitted light and produce a sensor signal, a frequency tuned amplifier, means for coupling said amplifier in a regenerative circuit comprising said sensor and said diode, said amplifier responsive to sensor signals to modulate the light emitted by said diode with a frequency established by the frequency determining parameters of said regenerative circuit, a utilization circuit, and means responsive to a change in the amplitude of said modulated light to control said utilization circuit.

9. A modulated light recognition system for responding to a change in the level of light comprising a source of light, a light sensor, means for transmitting light from said source through a light path to said sensor, said sensor responsive to said transmitted light for providing a sensor signal, a signal amplifier coupled in a regenerative circuit comprising said source and said sensor and the light path, said regenerative circuit oscillating to produce a light modulating signal of a given frequency, said source responsive to said modulating signal to modulate the level of the transmitted light at said given frequency, a control circuit normally operative in a first state and adapted to be switched to a second state in response to a change in the level of the modulated light due to a given change in the light transmission property of said path.

10. A photoelectric control system comprising a light source positioned to transmit light through a space to be monitored, a light sensor arranged to receive said transmitted light and produce a sensor signal, a frequency tuned amplifier, means for coupling said amplifier in a circuit oscillating at a given frequency comprising said sensor and said source, said sensor responsive to the amplified oscillations available from said amplifier to cause its light output to be modulated in intensity at said frequency, and a control circuit normally operative in a first state and adapted to be switched to a second state in response to said amplified oscillations having an amplitude of a given level.

References Cited

UNITED STATES PATENTS 3,109,094 10/1963 Marshall et al. ---- 250—221 X

FOREIGN PATENTS 616,360 3/1961 Canada.

LEE T. HIX, Primary Examiner

DENNIS J. HARNISH, Assistant Examiner

U.S. Cl. X.R.

330—85